Patented Apr. 13, 1954

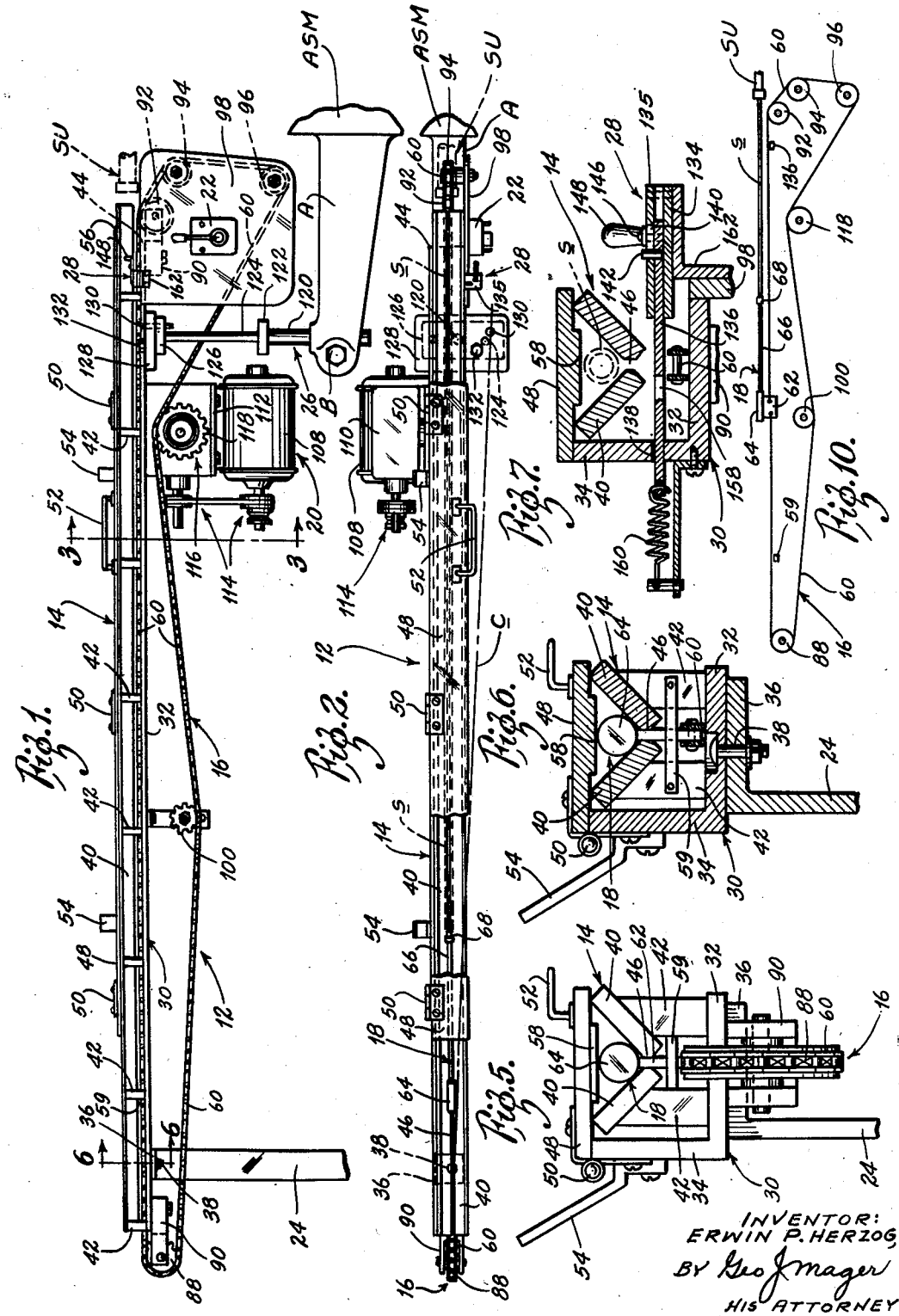

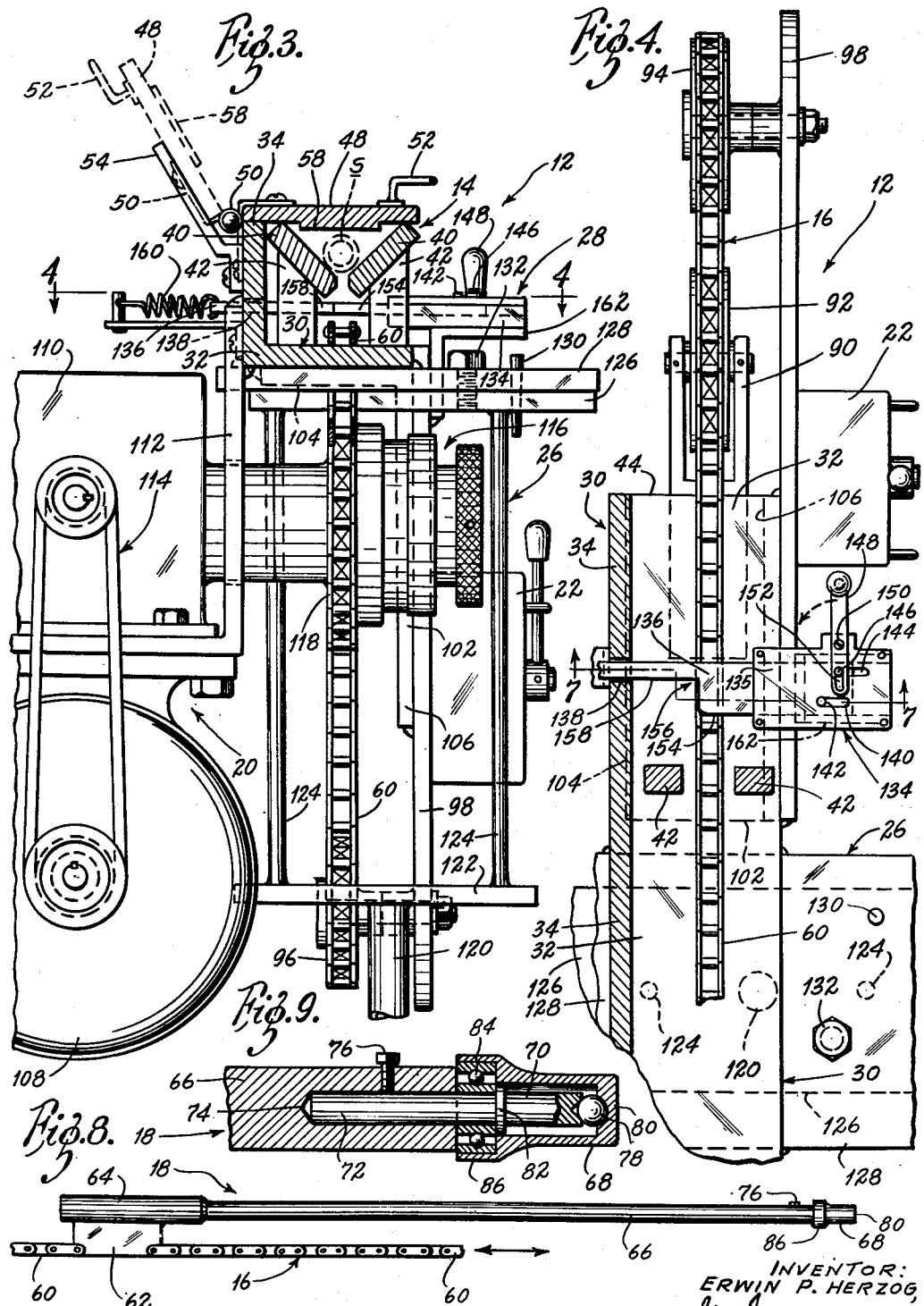

2,674,779

UNITED STATES PATENT OFFICE 2,674,779

OUTSIDE FEEDING MECHANISM FOR AUTOMATIC SCREW MACHINES

Erwin P. Herzog, St. Louis, Mo.

Application July 22, 1952, Serial No. 300,238

5 Claims. (Cl. 29—93)

The present invention relates generally to a novel mechanism in the form of an attachment for automatic screw machines.

More particularly, the invention relates to a novel mechanism for feeding stock to the spindle unit of an automatic screw machine, which feeding mechanism may be removably attached to a conventional machine of this type without requiring any changes whatever in the construction and operation of the latter.

The construction and operation of conventional screw machines is well understood by those familiar therewith, and will not therefore be described in detail. The spindle unit of such a machine contains: a spring collet for holding the stock while a machining operation is being performed; a feed tube and spring feeding finger combination for automatically successively advancing the stock following each such operation; a stock stop; and so on. It is also understood that the spindle unit is so designed that for certain operations, the automatic stock feeding combination thereof may be removed, so that the stock may be fed into said spindle unit by successive movements effected by means, either mechanically or manually operable, outside the screw machine.

With said feeding combination removed, bar stock of larger diameter than that which the spindle is designed to accommodate may be fed into the latter. A primary object of the present invention therefore, is to provide an efficient mechanism for feeding bar stock into the spindle unit of a screw machine, which stock is larger in diameter than stock normally fed thereinto.

With reference to smaller diametered stock, no great problem has existed heretofore when the initial length of said stock measured for example, one to three feet. However, when the initial length of a stock subjected to the action of the machine has exceeded the dimensions specified, considerable difficulty has been encountered.

Thus for example, assuming the stock were initially five feet long, the major portion thereof would be unsupported except manually, during the greater period of machining operations.

Further, great difficulty has been encountered in attempting to manually stabilize the otherwise unsupported length of stock while the machining operations proceed, as is understood. This difficulty is aggravated when the stock is tubular, and particularly so when said stock is not only tubular but also non-metallic.

An exemplary piece of stock which has been especially difficult to handle heretofore, is a five or six foot long tube of cellulose, and therefore light material. This type of stock is employed extensively in the manufacture of mechanical pencils, fountain pens, nail file handles, and so on, as is understood. The unsupported length of stock having such characteristics has an inherent tendency to quiver and vibrate as its spindle-encompassed portion is subjected to a machining operation.

A further object of the present invention is to provide a mechanism which includes means for automatically feeding bar stock, either solid or hollow, into the spindle unit of an automatic screw machine, and means for controlling the whipping and vibratory action of the projecting portion of the stock.

Further objects of the invention are to provide an outside stock-feeding mechanism for automatic screw machines in the form of a removable attachment, which is designed to accommodate bar stock of various lengths and diameters; which is particularly effective in connection with long length large diametered tubular stock of cellulose or other light weight material; which incorporates means for firmly engaging the trailing end of the stock being fed without offering the slightest resistance to the rotation thereof as its leading end is being subjected to the selected machining operation; which is independently driven; which includes means for clearing the spindle unit of any stock residue remaining in the collet after the final proper length section of a bar has been machined; and which has a pivotal mounting at one end whereby it may be swung horizontally and arcuately out of alignment with said spindle unit if desired.

Briefly, the invention provides a trough-like slideway for receiving lengths of stock, and for supporting a pusher rod assembly driven from a power unit by means of a sprocket and chain assembly. A plurality of idler sprockets are provided to support the chain, and the power unit is controlled by a conventional two-way switch, whereby the chain may be selectively driven either toward, or away from the spindle unit of a screw machine. The rear end portion of the slideway is pivotally mounted on the upper end of a suitable support, and the forward end portion thereof is releasably mounted on supporting structure, which may in turn, be supported from the projecting arm of an automatic screw machine.

A more comprehensive understanding of the advantages of the invention and its mode of operation may be had from the detailed description thereof to follow with reference to the accompanying drawings, wherein a preferable embodiment is illustrated.

In said drawings:

Figure 1 is a side elevational view of the mechanism embodying the present invention, the forward end thereof being supported from the rearwardly projecting arm of a fragmentarily shown conventional screw machine; the rear end being supported on a suitable standard shown broken off, but which extends to the floor as is understood; and the stock-receptive spindle unit of said screw machine being fragmentarily illustrated in broken lines;

Figure 2 is a top plan view of the structure portrayed in Figure 1, with certain parts broken away;

Figure 3 is an enlarged vertical sectional view taken on the line 3—3 of Figure 1;

Figure 4 is a horiontal plan view, partly in section, taken approximately on the line 4—4 of Figure 3;

Figure 5 is a rear end elevational view of the mechanism on an enlarged scale;

Figure 6 is an enlarged vertical sectional view taken on the line 6—6 of Figure 1;

Figure 7 is a similar view taken on the line 7—7 of Figure 4;

Figure 8 is a side elevational view of a pusher rod included in the reciprocable stock advancing assembly of the mechanism;

Figure 9 is an enlarged vertical sectional view of the stock-engaging forward end portion of the pusher rod illustrated in Figure 8; and Figure 10 is a schematic layout diagrammatically illustrating the stock-feeding operation.

In Figures 1 through 4, the feed mechanism incorporating the present invention is designated as a whole by the numeral 12. Said mechanism includes a stock-receiving assembly generally designated 14; a stock-advancing assembly generally designated 16, which includes the pusher rod assembly appearing per se in Figure 8 and generally designated 18; a power unit 20 for driving the feeding mechanism; a manually operable standard two-way switch 22 for controlling the action of said power unit; a vertical standard 24 for supporting the rear end portion of the mechanism 12; structure generally designated 26 for supporting the forward end portion of the mechanism; an abutment device generally indicated 28 for limiting forward movements of the pusher rod 18; and other structure and associated elements as will appear.

The assembly 14 comprises an elongated angular base member 30 including a horiontal leg section 32 integral with a vertical leg section 34. The length of the base member 30 is optional, the illustrated embodiment measuring approximately eight feet.

With reference to Figures 1 and 6, it is seen that the rear end portion of the base member 30 rests on a horizontally disposed flange 36 formed on the upper end of standard 24, and that a pivotal connection 38 is provided to maintain the relative disposition of the parts, and to permit the swinging of said base member about pivot 38 if desired as will be explained. Numerals 40 indicate a pair of spaced downwardly inclined rail members each rigidly supported on a series of longitudinally and laterally spaced posts 42 rigid with the horizontal leg portion 32 of base member 30, as shown. The rails 40 are at least coextensive with base member 30, and preferably as illustrated in Figures 1, 2, and 7, extend forwardly beyond the forward marginal edge 44 of said base member.

As appears to best advantage also in Figure 7, the disposition of the rails 40 is such as to provide a longitudinal space or opening 46 therebetween at the converging ends thereof. Numeral 48 indicates a cover plate pivotally mounted along the upper edge of the leg section 34 by means of hinges 50, as portrayed. The cover plate may be manually swung about said hinges by means of a handle 52 from the closed position thereof illustrated for example in Figures 5 and 6, to the open position thereof portrayed in broken lines in Figure 3. In the latter or stock-loading position, the cover plate 48 rests against a pair of suitable angular brackets 54 each rigidly secured to the vertical leg portion 34 of the base member 30 as shown.

Beginning at the forward marginal edge 56 of said cover plate, and extending rearwardly therefrom to a selected point slightly in advance of the pusher rod 18, is a depending stock-stabilizing segment 58 integral with said plate as shown, or otherwise rigidly secured to the underside thereof. Near the rear end of the mechanism 12, an abutment bar 59 is rigidly secured at its ends to a pair of the posts 42 aforesaid, as clearly shown in Figure 6.

The assembly 16 includes a sprocket chain 60, the ends of which are secured to a vertical plate 62 rigid with and depending from the cylindrical rear end portion 64 of the pusher rod 18, as best seen in Figure 8. Integral with said portion 64 is a forwardly extending rod portion 66 of reduced diameter which, as shown in Figure 9, supports a stock-engaging tip member 68. The tip 68 is of substantially thimble-shaped configuration, and is mounted for rotation about the projecting segment 70 of a pin 72 supported in a socket 74 formed in the rod 66 as shown. A set screw 76 maintains the pin in place, and a single ball bearing 78 is interposed between a pair of opposed sockets provided respectively in the head section 80 and the free extremity of the pin segment 70, as clearly illustrated.

Interposed about the pin 72 between the end face of rod 66 and a collar 82 formed on said pin is a ball bearing assembly 84, and the skirt portion 86 of the tip member is pressfitted onto the outer raceway of said bearing assembly. Thus it should be apparent that the stock-engaging tip 68 is freely rotatable about the projecting end 70 of the pin 72.

The assembly 16 further includes a plurality of sprockets over which the chain 60 is trained. Numeral 88 designates an idler sprocket mounted in a suitable bearing block 90, rigidly secured to and projecting rearwardly beyond the base member 30; 92 indicates a similarly mounted idler sprocket at the forward end of said base member; numerals 94 and 96 indicate idler sprockets mounted on a vertically disposed plate 98 which also supports the manual switch 22; and 100 designates an adjustably mounted idler sprocket for taking up any slack that may develop in the chain 60, as is understood. The plate 98, as best seen in Figures 3 and 4, is rigidly supported from the forward end of the base member 30 by means of an angle bracket 102, the horizontal leg portion 104 of which is welded as shown, or otherwise rigidly secured to the underside of the base section 32, and the vertical leg portion 106 of which is welded as shown, or otherwise rigidly secured to said plate.

The power unit 20 includes a conventional electric motor 108 of the reversible type; a conventional speed reducer 110; an angular bracket 112 welded to the base member 30 for supporting both the motor and speed reducer, as best seen in Figure 3; a variable speed driving connection 114 between the motor 108 and the speed reducer 110; and a clutch mechanism 116 including a driver sprocket 118, the latter in engagement with a section of the chain 60.

The clutch mechanism 116 is of the well known friction type which transmits rotary motion from a power source to an element to be driven, but which when properly adjusted, will "slip" when the motion of the driven element is arrested, as is understood.

With attention directed specifically to Figures 1 and 2, a conventional automatic screw machine is fragmentarily shown and designated ASM. The stock-receiving end portion of its spindle unit is portrayed in broken lines, and designated SU. In order to provide a convenient medium for mounting some of the hitherto designed outside attachments, screw machines are provided with a horizontally projecting arm A terminating in a split extremity for the reception of an attachment supporting stem, which may be clamped in position by means of a retainer bolt B.

The present invention takes advantage of the arm A for supporting the forward end of the mechanism 12. To this end, and with particular reference to Figures 3 and 4, the structure 26 includes a supporting stem 120; a crossbar 122 rigid therewith at the top; a pair of spaced vertically extending rods 124 each rigid with said cross-bar 122 at its lower end, and with a platform 126 at its upper end; a plate 128, rigidly secured as by welding to the underside of leg portion 32 of the base member 30, and resting on the upper surface of said platform; a pair of normally aligned apertures in the plate 128 and the platform 126 respectively, for the reception of a removable tapered dowel pin 130; and a tap bolt 132 for engaging a pair of normally aligned threaded apertures provided respectively in said platform and said plate.

The construction of the device 28 is best demonstrated in Figures 4 and 7. It includes a suitable channel-shaped guide member 134; a top cover 135 therefor; an abutment plate 136 reciprocably mounted at one end in said guide member and at its other end in an opening 138 provided therefor in the vertical leg 34 of the base member 30; a first elongated slot 140 in the cover 135; a guide pin 142 rigid with said abutment plate and projecting upwardly in said slot; a second elongated slot 144 in said cover; an actuator pin 146 rigid with the abutment plate 136 and projecting upwardly through and above the second slot 144; and a manually operable lever 148 pivotally mounted on the cover at 150 and having a slot connection 152 with the projecting upper end of the actuator pin 146.

The plate 136 includes a first abutment edge 154, and is cut away at at 156 to provide a second abutment edge 158. Numeral 160 designates a tension spring suitably anchored at one end, and having its other end connected to the plate 136, as clearly shown. The described device 28 is supported in position by an angle bracket 162 rigidly mounted on the vertical plate 98.

Prior to entering into a description of the operation, a few general observations will be given. For example, the wiring leading from switch 22 to motor 108, and that leading from a power source to said motor, has been omitted from the drawings. When the invention is in use, the power unit operates continuously, the manual switch 22 serving only to reverse the rotational direction of the motor 108, as is understood. Whereas the invention utilizes the arm A for mounting the forward end of the mechanism 12, the stem 120 may extend to the floor in the form of a pedestal in case the machine ASM is not provided with an arm A.

Since the upper stretches of the chain 60 reciprocate along the top surface of the base member leg 32, the latter surface should be greased regularly, to reduce wear on the chain to a minimum, and also to insure smooth reciprocational motion. Adequate clearance is provided between the lower surface of abutment bar 59 and the top of chain 60 at the rear, and between the lower surface of abutment plate 136 and the top of said chain at the forward end of the mechanism, as may be seen in Figures 5, 6, and 7. The plate 62 is freely slidable in the longitudinal opening 46 between said bar 59 and plate 136, and the latter is maintained in the normal position thereof portrayed in Figures 3, 4, and 7, by the tension spring 160.

The skirt portion 86 of the tip member 68 is slightly smaller in diameter than the cylindrical rear end portion 64 of the pusher rod, so that said tip may rotate freely as hereinbefore explained. It should further be noted that said skirt portion 86 is also smaller in diameter than the stock s, so that manifestly, the tip member 68 can freely pass through the stock-receiving opening of the spindle unit SU.

*Operation*

Assuming now that the regular feeding mechanism has been removed from the spindle unit, the motor is running, and that it is desired to feed for example, tubular stock of six foot lengths, switch 22 is thrown to the left whereby the drive sprocket 118 is caused to rotate clockwise. As a result, the chain 60 propels the pusher rod assembly 18 rearwardly until the plate 62 strikes against the abutment bar 59, thus arresting further rearward movement of said assembly, and causing the clutch 116 to slip, as is understood. This position of the pusher rod assembly 18 is portrayed in Figure 2.

With the cover 48 swung to its Figure 3 broken line position and resting against the brackets 54, a unit of stock is deposited, either manually or by mechanical means, into the trough-like receptacle formed by the rails 40, with the rear end of said stock in proximity to the rotatable tip 68 of the pusher rod. A properly placed unit of stock is suggested by broken lines in Figure 2, and designated s. Reference to Figures 3 and 7 in this connection is also invited.

By means of the handle 52, the cover 48 is now swung to the closed full line position thereof, and the switch 22 is manipulated to the right whereby the drive sprocket 118 is now caused to rotate counterclockwise. As a result, the chain 60 propels the pusher rod 18 forwardly to feed the stock s intermittently into the spindle unit SU for the subjection of its successive leading end portions to the action of the screw machine. This action is diagrammatically portrayed in Figure 10.

It is noted that with the clutch again slipping, a constant force is being exerted against the rear end face of the stock by the pusher rod, so that each time the collet in the spindle unit opens in order that more of the remaining portion of the stock s can be fed, said pusher rod is automatically advanced, until plate 62 strikes against the first abutment edge 154 of the plate 136.

It is also noted, that the tip 68 permits free rotation of the stock at all times, and that the depending segment 58 of the cover plate 48 stabilizes that portion of the stock remaining between said tip and spindle unit.

The distance between the collet and the first abutment edge 154 is approximately equal to the distance between the tip 68 and the forward edge of the plate 62, so that when the latter strikes against edge 154, the operator knows that the final proper length section of the stock has been machined.

Thereupon, handle 148 of the abutment device 28 is swung inwardly, as suggested by the broken line arrow in Figure 3, thus causing the actuator pin 146 to move outwardly. Consequently, the first abutment edge 156 is withdrawn so that the pusher rod assembly 18 advances until its plate 62 strikes against the second abutment edge 158, thus clearing the collet. At this point, switch 22 is thrown to the left whereby the assembly 18 is returned to its rearmost position, for a repetition of the described cycle.

From the immediately foregoing, it should be apparent that this invention provides novel means for solving a problem of long standing. It has always been difficult heretofore to clear the collet of the final invariably too short segment of bar stock. Failure to remove this short segment frequently resulted in damage to or breakage of tools as is understood. In the present feeding mechanism, this final segment is automatically ejected from the collet following withdrawal of the abutment edge 156 by swinging the handle 148 inwardly.

With reference to Figures 1 and 6 it is noted that a feature of the invention resides in the pivotal mounting of the assembly 16 at 38.

In other words, assuming for example, that it should be desired to operate the screw machine for a short period of time without the use of a feeding device, the dowel pin 130 may be removed, and the tap screw 132 withdrawn until it engages only the threaded aperture in plate 128, whereupon the entire assembly may be swung about the pivot 38 out of alignment with the spindle unit, with plate 128 still resting upon the platform 126, as suggested by the longitudinal centerline c in Figure 2.

From the foregoing description and an inspection of the drawings, it should be apparent that the invention provides a novel, compact independently driven mechanism in the form of an attachment, which is adapted to achieve its objectives in a highly efficient manner.

Whereas the drawings illustrate, and the preceding description sets forth the preferred embodiment thereof, it is to be understood that the invention contemplates any variations of structure, and equivalents or modifications which may fall within the scope of the appended claims.

What I claim is:

1. In an outside feeding mechanism in the form of an attachment for an automatic screw machine: a trough-like slideway assembly to receive lengths of stock and to support a pusher rod assembly for advancing said stock intermittently into the spindle unit of said machine; a sprocket chain the ends of which are attached thereto for reciprocating said pusher assembly along said slideway; a plurality of idler sprockets for supporting said chain in operative dispostion relative to said assembly; a driver sprocket in engagement with a stretch of said chain; a power unit including a friction clutch for rotating said driver sprocket selectively clockwise and counterclockwise responsive to the setting of a manually operable switch; a stationary abutment to limit movements of the pusher assembly away from said spindle unit; a movable abutment member to limit movements of said assembly toward said unit, the movable member having a first and a second abutment edge; spring means normally maintaining the movable member in a position wherein the first abutment edge thereof automatically limits the pusher assembly movements; and manually operable means for moving said member to a position wherein the second abutment edge thereof limits the movements of said assembly.

2. In an outside feeding mechanism in the form of an attachment for an automatic screw machine: a trough-like slideway assembly to receive lengths of stock and to support a pusher rod assembly for advancing said stock intermittently into the spindle unit of said machine; a sprocket chain the ends of which are attached thereto for reciprocating said pusher assembly along said slideway; a plurality of idler sprockets for supporting said chain in operative disposition relative to said assembly; a driver sprocket in engagement with a stretch of said chain; a power unit including a friction clutch for rotating said driver sprocket selectively clockwise and counterclockwise responsive to the setting of a manually operable switch; a stationary abutment bar for automatically limiting the stroke of the pusher assembly in one direction; a movable abutment plate for automatically limiting the stroke of said assembly in the opposite direction; a recess formed in said plate to provide therein a first and a second abutment edge, the first being farther removed from said spindle unit than the second edge; a tension spring normally biasing said plate to a position wherein the first abutment edge thereof limits the stroke of said assembly; and manually operable means for moving the plate to a position wherein the second abutment edge thereof limits said stroke.

3. In a mechanism for automatically feeding bar stock into the spindle unit of a screw machine, a stock-advancing assembly comprising in combination: a pusher rod including a cylindrical rear end portion and a similar forwardly extending portion of reduced diameter; a vertical plate rigid with and depending from said rear end portion; a stock-engaging tip member rotatably mounted about the projecting segment of a pin supported in a socket formed in the extremity of said forwardly extending rod portion the diameter of said tip member being smaller than that of said cylindrical rear end portion of the assembly; a sprocket chain the ends of which are secured to said depending vertical plate for reciprocating the pusher rod; a slideway to accommodate the reciprocal movements of said rod; a longitudinal opening in the slideway through which said depending plate projects; a series of idler sprockets including a takeup sprocket for supporting the lower stretch of said chain; an angular base member for supporting said slideway and the upper stretch of the chain; a driver sprocket for engaging the lower stretch of the chain; a power unit supported from said base member including a friction clutch for actuating said driver sprocket in a clockwise and a counterclockwise direction; a stationary abutment on the slideway to engage said depending plate for limiting the movements of said rod in one direction; and a movable abutment on the slideway to engage said plate for limiting the movements of said rod in the opposite direction.

4. The structure defined in claim 3, and stock-stabilizing means including: a cover plate for the slideway, a hinged connection between one longitudinal marginal portion of the cover and the upper marginal portion of the vertical leg of the base member; angularly disposed brackets secured to said vertical leg of the base member; a handle on the cover plate for swinging the latter about said hinged connection into engagement with said brackets preliminary to the deposit of a unit of stock into said slideway, and for thereafter swinging said plate into engagement with the top of said slideway; and a depending segment integral with said cover plate for minimizing the vibratory action of the stock remaining between the spindle unit and the tip member of the pusher rod.

5. In a feeding mechanism including a reciprocable pusher rod assembly for incrementally advancing bar stock into the spindle unit of an automatic screw machine and a slideway for supporting said assembly, an abutment device for limiting forward movements of said pusher rod, said device comprising: a channel-shaped guide member mounted adjacent the forward end of said slideway; a top cover for the guide member; an abutment plate reciprocably mounted in the guide member and having a free projecting portion extending laterally therefrom beneath said slideway; a recess formed in said projecting portion of the plate to provide a first or rear and a second or forward abutment edge; a first elongated slot in the top cover; a guide pin rigid with said plate projecting upwardly in said slot; a second elongated slot in said cover; an actuator pin rigid with the abutment plate projecting upwardly through and above the second slot; a manually operable lever pivotally mounted on the cover and having a slot connection with the projecting upper end of said actuator pin; and a tension spring anchored at one end and having its other end connected to the free projecting portion aforesaid of the abutment plate.

References Cited in the file of this patent

UNITED STATES PATENTS

| Number | Name | Date |
|---|---|---|
| 1,065,088 | Victory et al. | June 17, 1913 |
| 2,062,727 | Rich | Dec. 1, 1936 |
| 2,108,274 | Tautz et al. | Feb. 15, 1938 |
| 2,345,207 | Mansfield | Mar. 28, 1944 |
| 2,512,335 | Kholos | June 20, 1950 |
| 2,595,522 | Harvey | May 6, 1952 |
| 2,630,909 | Mariotte | Mar. 10, 1953 |